April 3, 1945.  H. PFLEUMER  2,372,793

METHOD FOR GAS EXPANDING CLOSED CELLULAR RUBBER

Filed Sept. 16, 1941

INVENTOR.
Hans Pfleumer
BY Samuel Ostrolenk
ATTORNEY

Patented Apr. 3, 1945

2,372,793

UNITED STATES PATENT OFFICE 2,372,793

METHOD FOR GAS EXPANDING CLOSED CELLULAR RUBBER

Hans Pfleumer, New Brunswick, N. J., assignor to Rubatex Products, Inc., New York, N. Y., a corporation of Delaware Application September 16, 1941, Serial No. 411,010

3 Claims. (Cl. 260—725)

My invention relates to methods for manufacturing expanded closed cell cellular rubber by external gaseous pressure and, more particularly, to a method for permitting such pressure to be effective in the interior of relatively thick rubber members. Various methods have been proposed and used for gas expanding closed cell cellular rubber and such methods are described in, for instance, the Denton Patent No. 1,905,269 and Denton Reissue Patent No. 21,245 and other related patents.

The primary object in the utilization of such methods is the production of an expanded rubber, either hard or soft, having a multiplicity of minute cells which are substantially not communicating.

Essentially, the process consists of preparing a rubber mix with suitable vulcanizer and subjecting this rubber mix to gas under pressure while partially vulcanizing the same. After the rubber has absorbed the gas, under pressure, the external gas pressure is reduced and the internal gas pressure expands the rubber in a mold. Thereafter the expanded rubber is fully vulcanized. These steps may be taken by a continuous process or the operation may proceed in various stages.

Essentially, the end result of all of these processes is the production of a hard or soft expanded rubber which consists of a multiplicity of minute cells, most of which are not communicating. Such processes have been found effective and thorough, particularly, in the gassing and expanding of relatively thin sheets, tubes, or rods of rubber.

In ordinary practice, while it is commercially practicable and usual to expand and gas quarter-inch or three-eighths inch stock, more time is needed to penetrate, for instance, a one-half inch thickness. The original sheet expands as much as eight times so that the end result may be a relatively thick very light sheet. But, when the sheet of plastic rubber, which is intended to be gassed to reach the expanded result, is as much as three-quarters of an inch in thickness or one inch thick, the time for the gassing operation is substantially increased. Likewise, when a cylinder, rod or tube exceeds one and one-quarter inches in diameter before expansion, the gassing time is also substantially increased.

In addition, as the thickness of the material to be gassed increases, the results achieved by the gassing differ, depending on the depth or thickness of the material. The outer surface may be fully gassed while the interior may possibly in relatively thick articles be, in fact, tightly compressed and not expanded at all.

In such cases the gas instead of penetrating throughout, though perhaps slowly, apparently tends to compress the inner portions of the solid rubber to such an extent that the absorption of the gas thereby is made very difficult or substantially slowed up. This holds true for flat as well as cylindrical shapes.

In the gassing of a rubber cylinder which is one and one-quarter inches in diameter or over, the center tends to remain practically solid and not only diminishes the expansion in diameter but tends to prevent expansion in length as well. This results from the fact that the gas pressure is attacking the rubber only from the surface towards the center, and as the material is penetrated, the center of the material tends to be compressed.

An important object of the present invention is to provide a series of channels in the rubber mass to be gassed to facilitate a thorough and speedy gassing operation. These channels may be very small in bore and nevertheless do the work as long as they are kept open during the gassing operation when the rubber becomes plastic. In order to accomplish this result, I have found that the channel should be filled out with a rather fluffy medium which prevents the collapse of the walls and the sticking together thereof.

A further object of this invention, therefore, is the provision of means in the rubber material which is to be gas-expanded which will ensure an appropriate channel for gases to penetrate throughout the entire mass. Such perforations or channels may not perhaps be usable in every article which is to be made of expanded rubber, but for the most part it is applicable to most materials.

In experiment I have found that cotton yarn serves the purpose of filling the channels very well, and of supporting the channels during the gassing operation.

A further object of the present invention, therefore, is the provision of a yarn or fiber in the rubber material which will provide a channel for the passage of gas therethrough in order to gas impregnate the entire rubber mass.

In the utilization of such yarns, such as cotton yarn, the interwoven mass of yarn may tend to inhibit expansion.

Accordingly, a further object of the present invention is to provide means for causing yarn or other fibers, used to provide channels, to disintegrate after they have served the function of ensuring the passage of gas into the interior of the article to be gassed.

These and many other objects of the present invention will become apparent in the following description and drawing, in which.

Figure 1:
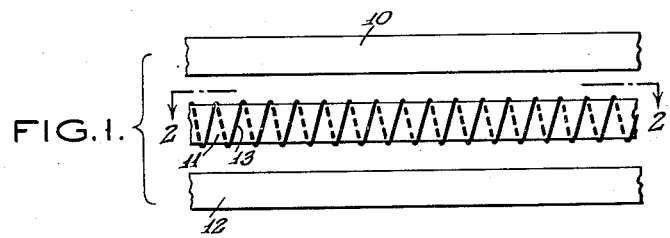
Figure 1 is a side view of three ungassed sheets of rubber which are to be plied together and gas-expanded to form a single gas-expanded sheet.

I have found that when preparing the rubber which is to be gas expanded by external gas pressure, if I incorporate therein a multiplicity of cotton yarns suitably arranged, then these cotton yarns provide an appropriate channel for the passage of gas under pressure into the interior of the mass to be expanded.

It must be remembered that the present gas pressures which are used in the processes above outlined may be as high as 5,000 pounds per square inch so that the bore of the channel for the passage of gas need not be of any substantial diameter but may be relatively small and insignificant. As long as such channels are provided by the cotton yarn or fiber threads incorporated in the rubber mass, the gas may penetrate into the interior of the rubber mass despite the very great external pressure on the rubber mass which tends to compress the center thereof.

Since the gas may penetrate into the very interior, then the gas pressure throughout the entire mass may be equalized with the gas pressure on the exterior of the mass, so that the entire rubber mass is subject to the same pressure.

When the outside pressure is thereafter decreased, and the gas in the interior of the rubber mass then expands in order to achieve a pressure equalization between the gas pressure on the interior and the gas pressure externally of the rubber mass, then if the entire rubber mass has been impregnated with gas at substantially the same pressure even to the center thereof, the entire rubber mass will expand equally and the center will not remain hard and unexpanded.

Where very large diameter pieces of rubber are to be expanded or where relatively thick sheets are to be expanded, then the combined strength of the many yarns or fibers used may be sufficient to prevent expansion in one direction and it is therefore necessary to treat the threads in such a manner that they will disintegrate before expansion but after the gas has penetrated.

A satisfactory method I have found is to immerse the threads in a 5% solution of sulphur chloride and carbon tetrachloride before placing them in the rubber mix. The immersion may be, for instance, ten seconds.

The carbon tetrachloride acts as the vehicle to permit a thorough impregnation of the yarn by the sulphur chloride. When the yarns have absorbed a predetermined amount of sulphur chloride, they are dried and stored on spools for use.

As long as the threads are not heated, they retain their tensile strength for a considerable time and can thus stand the strain of being embedded in the material to be expanded. But the threads will disintegrate upon heating during the gassing and vulcanizing cycle. However, even in this disintegrated condition, they provide continuous channels for the high pressure gases to enter.

The heat of the rubber while it is being extruded is insufficient to disintegrate the threads. Only the vulcanizing heat will do so.

After the beginning of the gassing cycle, after the pressure gas is fully applied, the pressure equalizes and since the gas has been permitted by the provision of these channels to penetrate into the interior, the pressure is the same on the outer surface and inside the channels.

During the vulcanizing heat, the gas pressure is automatically increased approximately by 50%. There is a temperature lag of the interior of the rubber pieces and the gas in the channels cannot expand. Obviously, the pressure inside and out is, however, kept equal by more gas being pressed into the channel.

However, when the interior of the rubber rises to a temperature equal to that of the surface, there is even more gas available within the very center of the sheet than the diameter of the channels would theoretically permit because of this temperature difference and this is further instrumental in a full gassing of the interior.

This invention is equally applicable to the processing of rubber which is to form various shapes, as well as to the processing of flat sheets or of cylinders of any length whatever.

The threads may be inserted in the rubber mass in any appropriate manner so that they may form appropriate channels for the communication of gas pressure into the interior.

Figure 2:
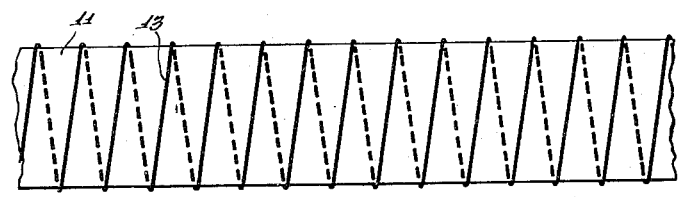
Figure 2 is a top view of the center sheet taken along line 2—2 of Figure 1.

In Figures 1 and 2 I have shown one way in which extra thick flat sheets may be formed so that the interior thereof may be appropriately gassed. In this form the flat sheet to be gassed is formed originally from three sheets 10, 11 and 12 of rubber. These sheets are eventually to be expanded by the processes hereinbefore pointed out. Before, however, laying the sheets together so that they may be expanded and vulcanized together, I wind the cotton yarn 13 around the center sheet as shown in Figures 1 and 2, and thereafter I ply the sheets together so that the sheets 10, 11 and 12 are in surface to surface relation to each other with the sheets 10 and 12 respectively lying on either side of sheet 11.

Now when gas pressure is applied to the composite sheet, and vulcanization begins, the gas may penetrate through the channels formed by the cotton yarn 13, in the manner previously described, toward the center of the sheet and the gas may expand outwardly from the channels thus formed to be absorbed by the rubber adjacent these channels. In this way, the interior of the center of the sheet is readily impregnated by the gas. Likewise, the channels formed by the yarn 13 may afford an efficient communication of gas pressure even for the adjacent surfaces of sheets 10 and 12 which may become vulcanized thereto.

Since the composite sheet thus formed and vulcanized together is now completely impregnated by the gas to be used for expanding the same, then when external gas pressure is released, the sheet may expand so that even the center thereof expands fully in the manner previously described.

By this means, a method is obtained for gassing a one and a half inch sheet so that the same may expand to approximately 3 to 3½ inches in thickness and 8 to 12 times in volume. The original sheet is in the form of three plies 10, 11 and 12, which are each a half-inch in diameter, the center sheet being wound with thread so that the individual loops are approximately one-half inch apart. When the sheets are plied and gassed, the entire sheet is expanded in the manner above described.

This process may be applied equally to soft expanded rubber members or to hard expanded rubber members.

Figure 3:
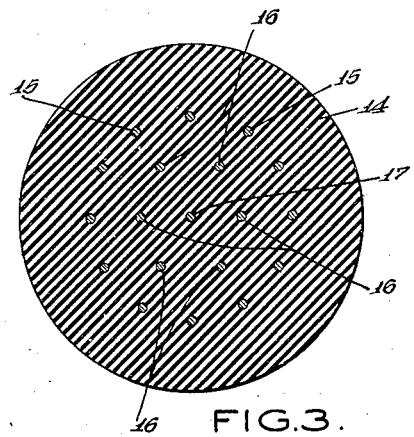
Figure 3 is a cross-sectional view of a rubber cylinder which is to be gas expanded.

In Figure 3 I have shown in cross-sectional view a rubber cylinder which is to be expanded. The rubber cylinder has therein a plurality of threads 15 which likewise provide a series of channels for the admission of gas under pressure in order that the very interior of the rubber cylinder may be appropriately gassed for expansion.

Preferably, and in accordance with standard tubing practice, I have found that a series of threads 16, 16 may be arranged in hexagonal form about a center thread 17, thus giving a hexagonal series of channels for the appropriate admission of gas.

In thicker cylinders, this may be increased by the addition of further threads 15 around the center hexagon made up of the threads 16. Threads 15, 16 and 17 may be extruded into the rubber cylinder when it is formed, in order that the said rubber cylinder may be appropriately expanded by the means hereinbefore described.

In the foregoing I have described but a preferred embodiment of my invention. Essentially the invention consists of the provision of means in the gassing operation for permitting the gas to penetrate to the uttermost center of the mass which is to be expanded. Such means comprises preferably a series of channels formed in the rubber mass. The channels, however, once under gas pressure should be supported.

A preferred method for supporting these channels is the provision of the cotton yarn in the manner hereinbefore described. In order to permit full expansion of the material, however, I have also provided means for disintegrating the cotton yarn so that the cotton yarn will not form a matting which inhibits expansion.

The cotton yarn in disintegrated form nevertheless provides an appropriate channel for the intrusion of the gas toward the very center of the mass.

Various other means may be used in order to form such channels and various other methods of utilizing this process in similar materials should now be obvious to those skilled in the art; and, accordingly, I prefer to be bound not by the specific disclosures herein but only by the appended claims.

I claim:

1. The method of forming closed cell cellular expanded rubber comprising the steps of incorporating a vulcanizing material in a rubber mass; incorporating a plurality of threads of cotton yarn impregnated with sulphur chloride in regular arrangement in said rubber mass; and impregnating the rubber mass with externally applied gas under pressure.

2. The method of forming closed cell cellular expanded rubber comprising the steps of incorporating a vulcanizing material in a rubber mass; incorporating a plurality of threads of cotton yarn impregnated with sulphur chloride in regular arrangement in said rubber mass; and impregnating the rubber mass with externally applied gas under pressure and heat at a vulcanizing temperature.

3. The method of forming closed cell cellular expanded rubber comprising the steps of incorporating a vulcanizing material in a rubber mass; incorporating a plurality of threads of cotton yarn impregnated with sulphur chloride in regular arrangement in said rubber mass; and impregnating the rubber mass with externally applied gas under pressure and heat at a vulcanizing temperature; said sulphur chloride being operative to weaken said cotton at said temperature and pressure.

HANS PFLEUMER.